US011830061B1

(12) United States Patent
Mitevski et al.

(10) Patent No.: US 11,830,061 B1
(45) Date of Patent: Nov. 28, 2023

(54) NETWORK TRAFFIC SURGE RESISTANT PLATFORM

(71) Applicant: Fevo, Inc., New York, NY (US)

(72) Inventors: Vladimir Mitevski, New York, NY (US); Ari Daie, New York, NY (US)

(73) Assignee: Fevo, Inc., New York, NY (US)

( * ) Notice: Subject to any disclaimer, the term of this patent is extended or adjusted under 35 U.S.C. 154(b) by 0 days.

(21) Appl. No.: 17/865,893

(22) Filed: Jul. 15, 2022

(51) Int. Cl.
| H04L 12/803 | (2013.01) |
| H04L 29/08 | (2006.01) |
| G06Q 30/0601 | (2023.01) |
| G06Q 20/40 | (2012.01) |
| G06Q 10/087 | (2023.01) |
| H04L 47/122 | (2022.01) |
| H04L 67/1001 | (2022.01) |

(52) U.S. Cl.
CPC ....... *G06Q 30/0641* (2013.01); *G06Q 10/087* (2013.01); *G06Q 20/401* (2013.01); *H04L 47/122* (2013.01); *H04L 67/1001* (2022.05)

(58) Field of Classification Search
CPC ....... H04L 47/12; H04L 47/122; H04L 67/06; H04L 67/10; H04L 67/1001; H04L 67/1097; G06Q 30/0641
See application file for complete search history.

(56) References Cited

U.S. PATENT DOCUMENTS

| 11,310,333 B2* | 4/2022 | Lepeska | ............. H04L 67/5681 |
| 11,636,512 B1* | 4/2023 | Mitevski | ............. G06Q 10/087 |
| | | | 705/14.45 |
| 2015/0269624 A1* | 9/2015 | Cheng | ............. G06Q 30/0261 |
| | | | 705/14.58 |

* cited by examiner

*Primary Examiner* — Boris D Grijalva Lobos
(74) *Attorney, Agent, or Firm* — McDonald Hopkins LLC; James P. Muraff

(57) ABSTRACT

A system and method to manage a surge network traffic targeting a service-hosting platform are disclosed. For an offer of goods and/or services, the platform provider generates a static package that is placed in networked storage that is accessible through a web service interface. The package contains the information required to instantiate and render the interface of the service-hosting platform using the processor and resources of the computer that accesses the package via a browser. Based on the contents of the package, the rendered interface presents the services of the service-hosting platform using resources of the customer's computer without making any calls to a server to query a protected backend system. Access to the protected backend resources and platform resources is gated by threshold actions taken by the user.

20 Claims, 7 Drawing Sheets

NETWORK TRAFFIC SURGE RESISTANT PLATFORM

RELATED APPLICATIONS

This application is related to U.S. patent application Ser. No. 17/865,906 entitled "A DYNAMIC USER INTERFACE FOR A NETWORK TRAFFIC SURGE RESISTANT PLATFORM," filed on Jul. 15, 2022, U.S. patent application Ser. No. 17/865,933 entitled "INVENTORY MANAGEMENT FOR A NETWORK TRAFFIC SURGE RESISTANT PLATFORM," filed on Jul. 15, 2022, U.S. patent application Ser. No. 17/865,951 entitled "INVENTORY MANAGEMENT SYSTEM PROTECTION FOR NETWORK TRAFFIC SURGE RESISTANT PLATFORM," filed on Jul. 15, 2022, and U.S. patent application Ser. No. 17/865,989 entitled "AUTHENTICATION MANAGEMENT FOR A NETWORK TRAFFIC SURGE RESISTANT PLATFORM," filed on Jul. 15, 2022, each of which is herein incorporated by reference in their entirety.

TECHNICAL FIELD

The present invention is generally related to webhosting of electronic commerce and, more specifically, management of surge network traffic to an electronic commerce platform.

BACKGROUND

Purchasing high demand goods and/or services, such as popular toys or event tickets, can be frustrating for consumers and potentially debilitating for electronic commerce platform providers. Increasingly, merchants use flash sales or other such events where all or part of the available inventory is, for a limited amount of time, offered to a group of people at a special price and/or is offered as an opportunity to purchase before the general public. Merchants may use such events to offer benefits to a particular group of customers (e.g., premium members, students, faculty, etc.), as a form of price differentiation, and/or to capture the attention of highly motivated customers, etc. Sometimes, instead of a preplanned event, consumer interest in a good or service is so high that a similar surge in traffic is generated upon an initial offer of the good or service. In such scenarios, instead of managing infrastructure (e.g., servers, databases, network bandwidth, etc.) for mean site traffic, the merchant's site must be configured to handle relatively infrequent surges of high network traffic volume that include a large number of requests into the merchant's backend infrastructure. For example, a flash sale can act like a denial of service attack, even though the entire traffic is legitimate. Often, backend systems, such as inventory management systems, are built with older technology that cannot handle the massive volume of queries into its databases. Such backend systems can be overwhelmed by these high traffic value events.

SUMMARY

Systems and methods for providing an electronic commerce platform that manages surges of high network traffic volume while protecting backend computing resources are described herein. For an offer of goods and/or services, the platform provider generates a static package that is placed in networked storage (e.g., networked object storage, etc.) that is accessible through a web service interface. The package contains the information required to instantiate and render the interface of the store, as well as information that is necessary to complete a transaction. When the offer is electronically communicated via a link, the linked location on the merchant platform's server includes just enough HTML instructions to retrieve the package from the storage and instantiate the interface. Based on the contents of the package, the interface of the merchant platform is then rendered in the browser of the customer using the processor and resources of the customer's computer (e.g., not the resources of a server of the merchant platform). During this process, the graphical elements of the interface may be retrieved from the networked storage. Based on the contents of the package, the rendered interface presents available inventory and performs cart management (e.g., presenting available inventory, selecting/deselecting goods and/or services to be placed in the cart, etc.) using resources of the customer's computer without making any calls to a server to query an inventory management system. The interface only performs backend calls (e.g., calls to the merchant platform server, etc.) when necessary to complete the next stage of the transaction (e.g., after the customer takes an affirmative step in the transaction). For example, when the customer clicks on an action button that signals that they desire to proceed with checking out, a call to an inventory server to query the relevant inventory management system(s) is made to place a temporary hold on the desired inventory. The rendered interface collects information to authenticate the identity of the customer and collects payment information. The interface then performs backend calls to the relevant system (e.g., the payments system, the customer management system, etc.) to verify the customer's information and process the payment. After the payment is processed and the customer is identified, the merchant platform makes a call to the inventory management system to reserve the goods and/or services for the customer.

An example network traffic surge resistant system includes network storage and one or more servers configured as a commerce platform. The commerce platform generates a script, an offer package, and an offer instantiator, and stores the script and the offer package onto the network storage. The offer instantiator specifies the location of the script and the offer package in the network storage. In response to a browser operating on a computing device accessing the offer instantiator, the offer instantiator causes the browser to retrieve the script and the offer package from the network storage. The script causes the browser to instantiate a cart interface within the browser based on the offer package using the resources of the computing device without making a backend call to the commerce platform. The cart interface includes an action button. The script also causes the browser to perform cart management functions without making a backend call to the commerce platform until detecting an interaction with the action button. In response to detecting an interaction with the action button, the script causes the browser to send the backend call to the commerce platform, and instantiate, in the browser, a checkout interface based on the offer package and a response to the backend call using the resources of the computing device.

An example method to provide a surge resistant online platform includes generating, by the online platform, a script, an offer package, and an offer instantiator, and storing the script and the offer package onto the network storage, the offer instantiator providing the location of the script and the offer package in the network storage. The method also includes retrieving, by a browser operating on a computing device at the direction of the offer instantiator, the script and the offer package from the network storage. The method includes instantiating, by the script executing in the browser, a cart interface within the browser based on the offer package using the resources of the computing device without making a backend call to the commerce platform. The cart interface includes an action button. Additionally, the method includes performing, by the script executing in the browser, cart management functions without making a backend call to the commerce platform until detecting an interaction with the action button. The method includes in response to the interaction with the action button, by the script executing in the browser, (i) sending the backend call to the commerce platform, the backend call including an identity and quantity of a good or service currently present in the cart interface to be purchased, and (ii) instantiating, in the browser, a checkout interface based on the offer package and a response to the backend call using the resources of the computing device, the checkout interface including one or more checkout buttons and a selection interface to facilitate a user changing the quantity of a good or service currently present in the checkout interface.

An example system to provide a network traffic surge resistant platform includes network storage devices, and one or more servers configured as the network traffic surge resistant platform. The network traffic surge resistant platform (i) generates a script, an offer package, and an offer instantiator, (ii) stores the script and the offer package onto the network storage, the offer instantiator providing the location of the script and the offer package in the network storage, and (iii) provides the offer instantiator to multiple browsers each operating on a different computing device. The offer instantiator causes each of the browsers to retrieve the script and the offer package from one of the network storage devices. The script causes each of the browsers to instantiate a cart interface within the browser based on the offer package using the resources of the corresponding computing device without making a backend call to the network traffic surge resistant platform such that the multiple browsers simultaneously instantiating the cart interface does not cause network traffic directed at the network traffic surge resistant platform. The cart interface includes an action button. The script causes each of the browsers to perform cart management functions without making a backend call to the commerce platform until detecting an interaction with the action button, such that the multiple browsers simultaneously performing the cart management functions in the cart interface does not cause network traffic directed at the network traffic surge resistant platform. In response to the interaction with the action button, the script causes the corresponding browser to (i) send the backend call to the commerce platform, and (ii) instantiate, in the browser using the resources of the corresponding computing device, a checkout interface based on the offer package and a response to the backend call.

BRIEF DESCRIPTION OF THE DRAWINGS

Operation of the present disclosure may be better understood by reference to the following detailed description taken in connection with the following illustrations, wherein.

DETAILED DESCRIPTION

Figure 1:
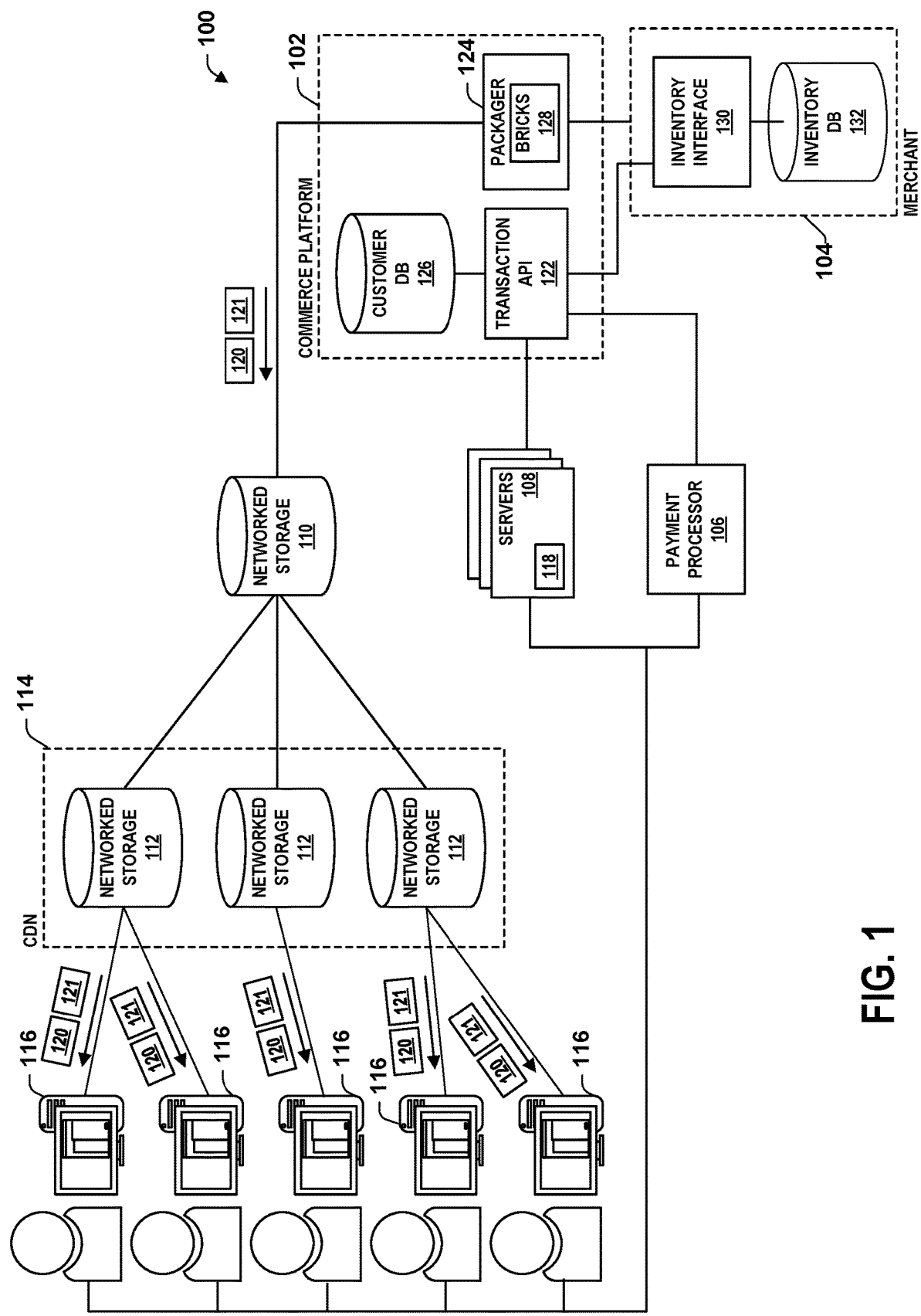
FIG. 1 is a block diagram of an example system to provide an electronic commerce platform to manage a surge network traffic, according to the teachings of this disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Commerce platforms that offer high demand and/or limited time offers for good and/or services often require backend systems (e.g., physical and/or virtual servers, databases, network bandwidth, etc.) that are deployed to meet or scale to surges in network traffic as a large number of customers simultaneously attempt to procure the goods and/or services. For example, platforms that handle ticket sales for major events (e.g., sports, concerts, etc.) often see such surges in network traffic as tickets are released. These surges can be orders of magnitude greater than the mean or ordinary network traffic and can overwhelm the commerce platform and its surrounding infrastructure with the flood of Internet traffic. Managing these sources can be costly and error prone, as it depends on recognizing the surge and differentiating the surge from illegitimate traffic (e.g., a denial of service attack, etc.). Additionally, in many cases, some backend systems, such as inventory management systems, are deployed using technology that is hard to scale (if even possible) and cannot handle the volume of requests necessary to service the traffic. For examples, generally scalability must be part of the design of a database and many inventory systems were deployed before scalability was required. This can lead to slowing, instability and/or termination of the operation of the ecommerce platform because the network and the backend system cannot cope or adapt quickly to the surge. Attempted techniques, such as queues and timed inventory reservation systems, etc., are often not effective in mitigating the effects of surges in the network traffic and can be used by malicious actors and/or undesirable consumers to deny some or all customers access to purchasing the good and/or services on the commerce platform. Accordingly, there are technical problems that prevent a commerce platform from being able to manage surges in network traffic volume without negatively affecting the backend systems that comprise the commerce platform.

The term "server" has its ordinary meaning. Generally, a server provides computational services in a request—response model where in response to a request (sometime referred to as a "call") over a network, the server performs some computational action and sends a response back to the requesting computer. As used herein, a "backend call" refers a request by an interface operating on the computing device of a customer to a non-static network resource (e.g., a server, a database, etc.). A "backend call" generally requires the server(s) of the commerce platform to process the request and generate information to be sent to the requester that is responsive to the contents of the request. For example, the backend call may require a query into an inventory database to determine status of inventory associated with the offer. Though the intensity can vary, backend calls are relatively computationally intensive to network resources. The terms "network storage" and "cloud storage" have their ordinary meaning. Generally, network storage provides object storage through a web service interface to facilitate remote storage and retrieval of data objects. As used herein, a "static call" refers to a request to a static network resource, such as networked storage that stores data objects (e.g., visual elements for an interface, scripts to be executed by the interface, offer packages, etc.). Static calls are relatively computationally inexpensive. As used herein, an "offer instantiator" refers to a document designed to be processed in a web browser that includes (i) structure (e.g., written in HTML code, etc.) necessary to render a cart interface, (ii) a location of where to receive a related offer package (e.g., from networked storage), and (iii) a location to receive a script to render the cart interface using the structure and the offer package.

A merchant that desires to make an offer via a surge traffic resistant commerce platform ("commerce platform") generates an offer package through the commerce platform. The offer package contains information necessary to render a cart interface and browse inventory associated with the offer without making backend calls to the commerce platform or any inventory management system tracking the inventory associated with the offer. The package may be, for example, generated in a data-interchange format. The packages is then stored on one or more static network storage devices. To communicate the offer, the commerce platform creates a link (e.g., a Uniform Resource Locator (URL), etc.) that points to an address that contains the location of the offer package, the location of the script to render the cart interface, and a minimum amount of code (e.g., HTML, etc.) necessary to use the script to render the cart interface.

When a consumer activates the link, the consumer's browser fetches the offer package and the script to render the cart interface (e.g., by generating browser readable code, etc.) on the commuting device executing the browser. That is, instead of a server (e.g., one of the servers of the commerce platform) generating the cart interface and then sending the browser readable code defining the cart interface to the browser, the computing device of the customer generated the browser readable code for the cart interface using the script and based on the offer package. In such as manner, when a surge of customers are simultaneously or near simultaneously interacting with the cart interface, a corresponding surge of traffic is not generated and directed at the servers of the commerce platform and those servers are not overwhelmed by the resulting processing to generate and update the cart interface. The cart interface includes an action button. The browser generated cart interface performs pre-checkout cart management functions using the resources of the browser without making inventory or checkout related backend calls to the servers of the commerce platform until the action button is activated (e.g., "clicked on") by the customer. These pre-checkout cart management functions include browsing inventory (e.g., names, descriptions, and/or prices of inventory available through the offer, etc.), receiving an indication of the type and/or quantity that the customer desires to purchase, and/or calculating an estimated total cost of the indicated type and quantity. Because the package includes all of the inventory information (e.g., offer details, identities and descriptions of inventory available with the offer, price, etc.), the cart interface performs these pre-checkout functions without making any backend calls. Thus, a surge of customers browsing inventory, many of whom are not likely to complete a purchase, does not create a corresponding surge in network traffic or server load for the commerce platform. From time-to-time, the commerce platform may asynchronously regenerate the offer package to change any part of the offer, including available inventory, the theme or template, etc., to replace the previous package at the same location in the static network storage. Thus, the merchant may dynamically update the cart interface without causing a surge of network traffic or server load.

When the customer activates the action button, the browser renders, based on the offer package, a checkout interface and makes a backend call that includes the identities and quantities of the inventory in the current cart of the cart interface. This backend call causes one of the servers to calculate the actual (e.g., non-estimated) cost, including the unit cost of each item and any associated fees, to the items in the cart and report that total to the checkout interface. The customer may change quantities (e.g., add quantities, subtract quantities, delete items, etc.) in the checkout interface. Each changes results in the backend call to calculate the total cost of the items. These price calculations are performed without querying the inventory management system of the merchant. Thus, a large number of such backend calls does not result in an increased load on the merchant's inventory management system. In some examples, these backend calls are configured to be computationally light to reduce any strain on the servers of the commerce platform.

When the browser receives the calculation, the checkout interface displays the total. The checkout interface performs a redirect to a payment processor. In some examples, this causes the payment processor to instantiate one or more payment electronic widgets (e.g., a Google® Pay widget, an Apple® Pay widget, etc.) and/or a credit card payment widget in the checkout interface. Interacting with one of the electronic payment widgets or the credit card payment widget (e.g., providing payment credentials, etc.) causes the payment processor to generate a payment intent that places a hold on funds equal to the calculated amount. Up to this point, the merchant platform does not make any call to the inventory management system of the merchant. After the payment processor signals that the payment intent was successful, the commerce platform attempts to place a reserve on the items with the inventory management system of the merchant. When the inventory management system signals that the attempt to reserve the inventory was successful, the commerce platform initiates one or more authenticity/security checks (sometimes referred to as "authorization challenges") with the customer via the checkout interface. When all of the authenticity/security checks are successful, the commerce platform requests that the inventory management system place the reserved items in a fulfillment status. The commerce platform then signals the payment processor to complete the transaction based on the purchase intent. The commerce platform then performs post-purchase fulfillment actions via the checkout interface. In such a manner, the commerce platform minimizes network traffic, server load, and load on the inventory management system by only generating such activity when the customer has affirmatively signaled their desire to complete a transaction and only to the extent necessary for their current level of commitment.

FIG. 1 is a block diagram of an example system 100 to provide an electronic commerce platform 102 to manage a surge network traffic. In the illustrated example, the commerce platform 102 is communicatively coupled to merchant networks (e.g., merchant network 104) and payment processors 106. The commerce platform 102 is also communicatively coupled to one or more webservers 108 (e.g., physical servers, virtual servers, and/or virtualized containers, etc.) and one or more network storage devices 110 (e.g., Amazon® S3, Google®Cloud Storage, Azure® Blob Storage, IBM® Cloud Object Storage, etc.). Data objects stored in the network storage devices 110 may be pushed onto network storage devices 112 that are part of a content delivery network (CDN) 114 to be accessed by browsers operating on computing devices 116 (e.g., desktop computers, laptop computers, smart phones, tablets, smart televisions, etc.). The commerce platform 102 facilitates generation of offer instantiators 118, offer packages 120, and interface building scripts 121 by a merchant to offer goods and/or services managed by the merchant network 104 though the commerce platform 102.

The commerce platform 102 includes a transaction application programming interface (API) 122, a packager 124, and a customer database 126. In the illustrated example, the While in the illustrated example, the transaction API 122, the packager 124, the customer database 126, and the webservers 108 are illustrated as being conceptually grouped in a certain configuration for simplicity, these components may be otherwise situated in any suitable manner (e.g., on cloud servers, etc.). The transaction API 122 facilitates communication between the webservers 108, the payment processor 106, the merchant network 104, and the customer database 126. The packager 124 receives input from the merchant to generate the offer instantiator 118, the offer package 120, and the interface building script 121 using software bricks 128. In some examples, the packager 124 generates the offer package 120 in a data-interchange format (e.g., JavaScript Object Notation (JSON), Extensible Markup Language (XML), YAML, etc.). In some examples, the packager 124 generates the interface building script 121 in a scripting language, such as Javascript. The software bricks 128 are offer package components that define the parameters, metadata, available inventory and/or audiovisual assets of the offer and the interrelationship between these parameters, metadata, available inventory and/or audiovisual assets. The Customer database 126 stores customer information to facilitate assigning an order from a checkout interface in a browser to a particular account or accounts for security and fulfillment purposes. The structure and organization of the offer package 120 are dictated by which bricks are used to generate the offer package 120.

Using the packager 124, the merchant defines the offer and provides an inventory data object (e.g., a two dimensional array, etc.) that specifies the available inventory for the offer and attributes of the inventory that the merchant uses to distinguish the inventory. For example, the data object may include a row for each seat in a venue that is to be part of the offer and a column for the section, a column for the row, a column for the seat. The packager 124 generates a unique link (e.g., a URL link, etc.) that instructs a browser where to locate the offer instantiator 118. The offer package 120 contains the information necessary for the interface building script 121, when accessed by a browser, to render the cart interface and the checkout interface, including a description of the available inventory to facilitate a customer browsing the inventory through the cart interface without making any backend calls to the webservers 108 and/or the transaction API 122. After the offer instantiator 118, offer package 120, and interface building script 121 are created, the packager 124 publishes the instantiator 118 onto the webservers 108 and pushes the offer package 118 and script 121 onto the networked storage 110 and 112. The link to the instantiator 118 may then be provided to customers. In the illustrated example, the instantiator 118 is located on a server and is accessible via a domain that is controlled/operated by the commerce platform 102. Alternatively, in some examples, the instantiator 118 maybe located on a server and accessible via a domain that is controlled/operated by another party (e.g., the merchant network 104, a third party, etc.).

The merchant may, from time-to-time, rebuild the offer package 130 with new and/or updated parameters, metadata, available inventory and/or audiovisual assets of the offer. When the offer package 130 is rebuilt, the packager 124 pushes the updated offer package to replace the old offer package in the networked storage 110 and 112. In such a manner, the merchant can dynamically and asynchronously update the offer package 130 while customers access the offer instantiator 118 without interruption.

The example merchant network 104 includes an inventory interface 130 and an inventory database 132 (collectively may be referred to as an "inventory management system"or "IMS"). The inventory interface 130, using the inventory database 132, provides the inventory data object. The inventory interface 130 may also manipulate the inventory in the inventory database 132 by, for example, changing the status of the inventory (e.g., reserving the inventory, marking the inventory for fulfillment, etc.). In some examples, the inventory interface 130 may limit the frequency at which the packager can request a refresh of the inventory data object.

When a consumer activates the link to the offer instantiator 118, the consumer's browser performs a static call to retrieve the offer package 120 and the script 121 to render the cart interface (e.g., by generating browser readable code, etc.) from the network storage 110 and 112. The browser then renders the cart interface by executing the script 121 that then uses the offer package 120. The browser generated cart interface performs pre-checkout cart management functions using the resources of the browser. These pre-checkout cart management functions include browsing inventory (e.g., names, descriptions, and/or prices of inventory available through the offer, etc.) as defined by the inventory data object (e.g., as processed by the bricks 128).

When the customer activates the action button, the browser renders, based on the offer package 120 and the script 121, a checkout interface and makes a backend call that includes the identifiers (sometimes referred to as "inventory unit identifiers") that identify inventory in the current cart of the cart interface and quantities of the inventory in the current cart of the cart interface. This backend call causes one of the servers 108 to calculate the actual (e.g., non-estimated) cost, including the unit cost of each item and any associated fees, to the items in the cart and report that total to the checkout interface. The customer may change quantities (e.g., add quantities, subtract quantities, delete items, etc.) in the checkout interface. Each changes results in the backend call to the servers 108 to calculate the total cost of the items.

When the browser receives the calculation, the checkout interface displays the total. The checkout interface performs a redirect to the payment processor 106. In some examples, this causes the payment processor 106 to instantiate one or more payment electronic widgets (e.g., a Google® Pay widget, an Apple® Pay widget, etc.) and/or a credit card payment widget in the checkout interface. Successfully credentialing through one of the electronic payment widgets or the credit card payment widget causes the payment processor 106 to generate a payment intent that places a hold on funds equal to the calculated amount. After the payment processor 106 signals that the payment intent was successful, the transaction API 122 attempts to place a reserve on the items with the inventory management system. When the inventory management system signals that the attempt to reserve the inventory was successful, the transaction API 122 initiates one or more authenticity/security checks with the customer via the checkout interface. When all of the authenticity/security checks, the transaction API 122 requests that the inventory management system place the reserved items in a fulfillment status. The transaction API 122 then signals the payment processor 106 to complete the transaction based on the purchase intent. The transaction API 122 then performs post-purchase fulfillment actions via the checkout interface.

Figure 2:
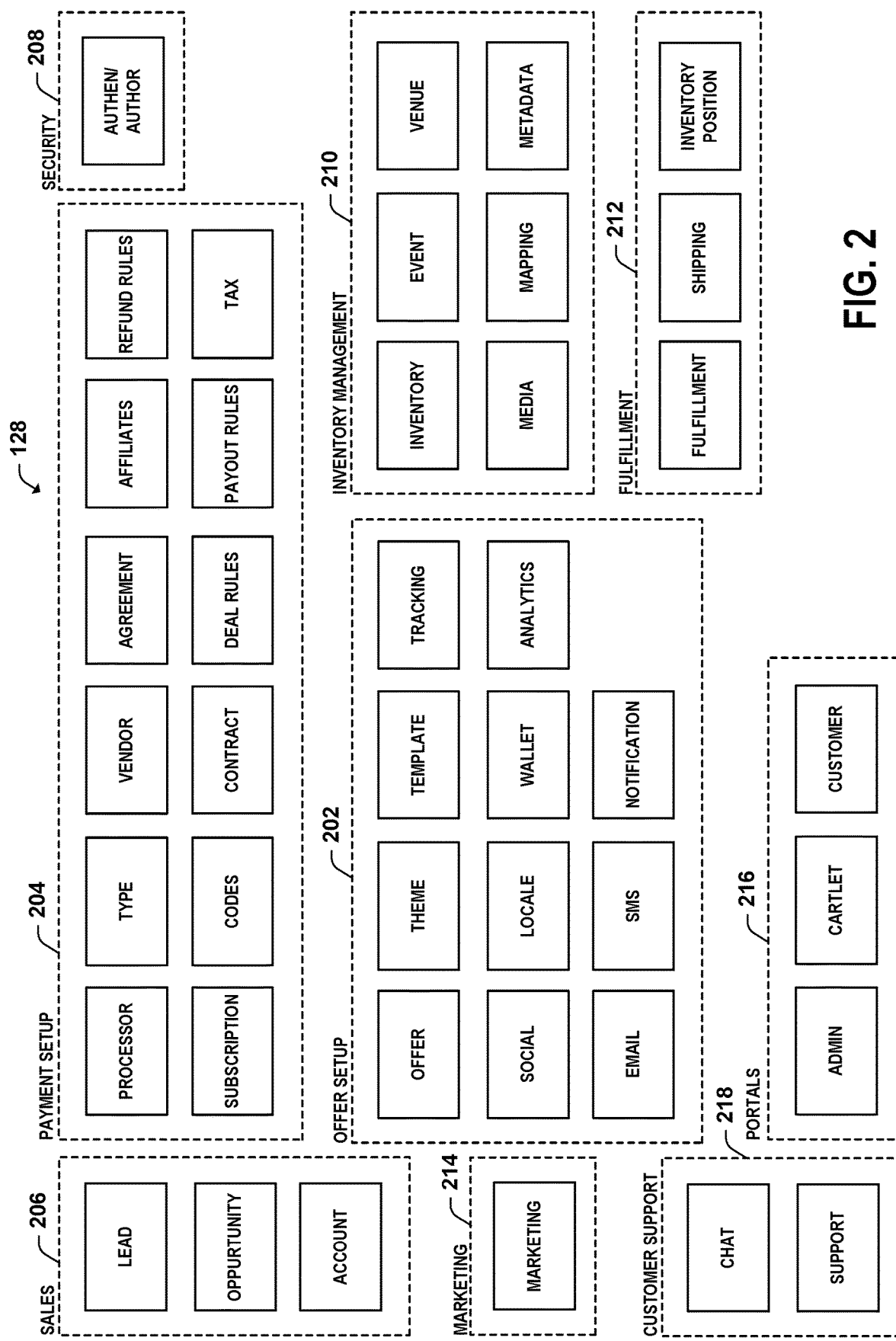
FIG. 2 is a conceptual diagram of bricks used to construct a package used to manage the surge network traffic, according to the teachings of this disclosure.

FIG. 2 illustrates examples of the bricks 128 used to define and construct the offer package 120. The bricks 128 are software structures that define the parameters, metadata, available inventory and/or audiovisual assets of the offer, the interrelationship between these parameters, metadata, available inventory and/or audiovisual assets, and the syntax of the data interchange format in which the package 120 is being created. The bricks 128 may be independently modified from the offer packages 120 such that when an offer package 120 is republished after a brick 128 used to construct the offer package 120 is updated, the updated structure is imported into the republished offer package 120. When creating the offer package, the merchant may select the relevant bricks 128 to define the look and feel, the functionality, inventory management and grouping, and the order flow associated with the cart interface that is rendered using the offer package 120 constructed using the bricks 128 selected and populated by the merchant. The bricks 128 facilitate building the offer package 120 so to include the necessary parameters, metadata, available inventory and/or audiovisual assets of the offer and/or tokens point to the parameters and/or metadata to perform front end actions (e.g., the computing device 116 rendering the cart interface for the offer) and to perform backend actions (e.g., handle payment, refunds, fund allocation, customer service, etc.). In the illustrated example, the bricks 128 are arranged in thematic groups. However, the bricks 128 may be arranged in any manner. For example, when the packager 124 packages the selected bricks 128, into the offer package 120, the resulting structure of the offer package 120 mirrors the bricks 128. In some examples, the bricks 128 define interface elements that translate the structure of the bricks into interactable objects within an interface to design an offer. The interactable objects have inputs that facilitate receiving the information necessary to render the component of, for example, the cart interface and define relationships between the bricks 128. As such, as bricks 128 are added to an offer, a corresponding interface in an offer editor is generated.

In the illustrated example of FIG. 2, a group of bricks 128 is classified in an offer setup group 202. The bricks 128 in the offer setup group 202 are used to build the look and feel of the cart interface as well as the operation of the cart interface related to the specific offer. A group of bricks 128 is classified in a payment setup group 204. The bricks 128 in the payment setup group 204 are used to define rules for a transaction made of the specific offer and establish a transactional route and history for every good and/or service purchased through the offer. A group of bricks 128 is classified in a sale group 206. The bricks 128 in the sales group 206 interface with external servers to connect offers to the merchant and facilitate merchant account management. The offer setup group 202, the payment setup group 204, and the sales group 206 contribute structure and metadata to the offer package 120 to facilitate forensically tracing and justifying any transaction that is made according to the offer package 120 and to supply a system with information to complete a transaction while minimizing the transaction's use of backend calls.

In the illustrated example, a group of bricks 128 is classified in a security group 208. Bricks 128 in the security group 208 provide parameters and metadata for performing the multiple security check to authenticate a customer and check if the customer is authorized to perform the transaction. A group of bricks 128 is classified in an inventory management group 210. Bricks 128 in the inventory management group 210 provide parameters and metadata for slicing and presenting inventory in the cart interface and interfacing with the inventory management system of the merchant. A group of bricks 128 is classified in a fulfillment group 212. Bricks 128 in the fulfillment group 128 provide parameters and metadata for fulfilling and delivering inventory after a successful transaction. A group of bricks 128 is classified in a marketing group 214 to provide support to attributing sales of goods and/services to parties involved in completing the transaction (e.g., first party or third party sales agents, etc.). A group of bricks 128 is classified in a portals group 216. Bricks 128 in the portals group 216 provide top level structure to packages, including the offer package 120. A group of bricks 128 is classified in a customer support group 218 that includes structure, parameters, and metadata to render a customer support interface and to process customer support requests while minimizing the number of backend calls the customer's browser performs.

Figure 3:
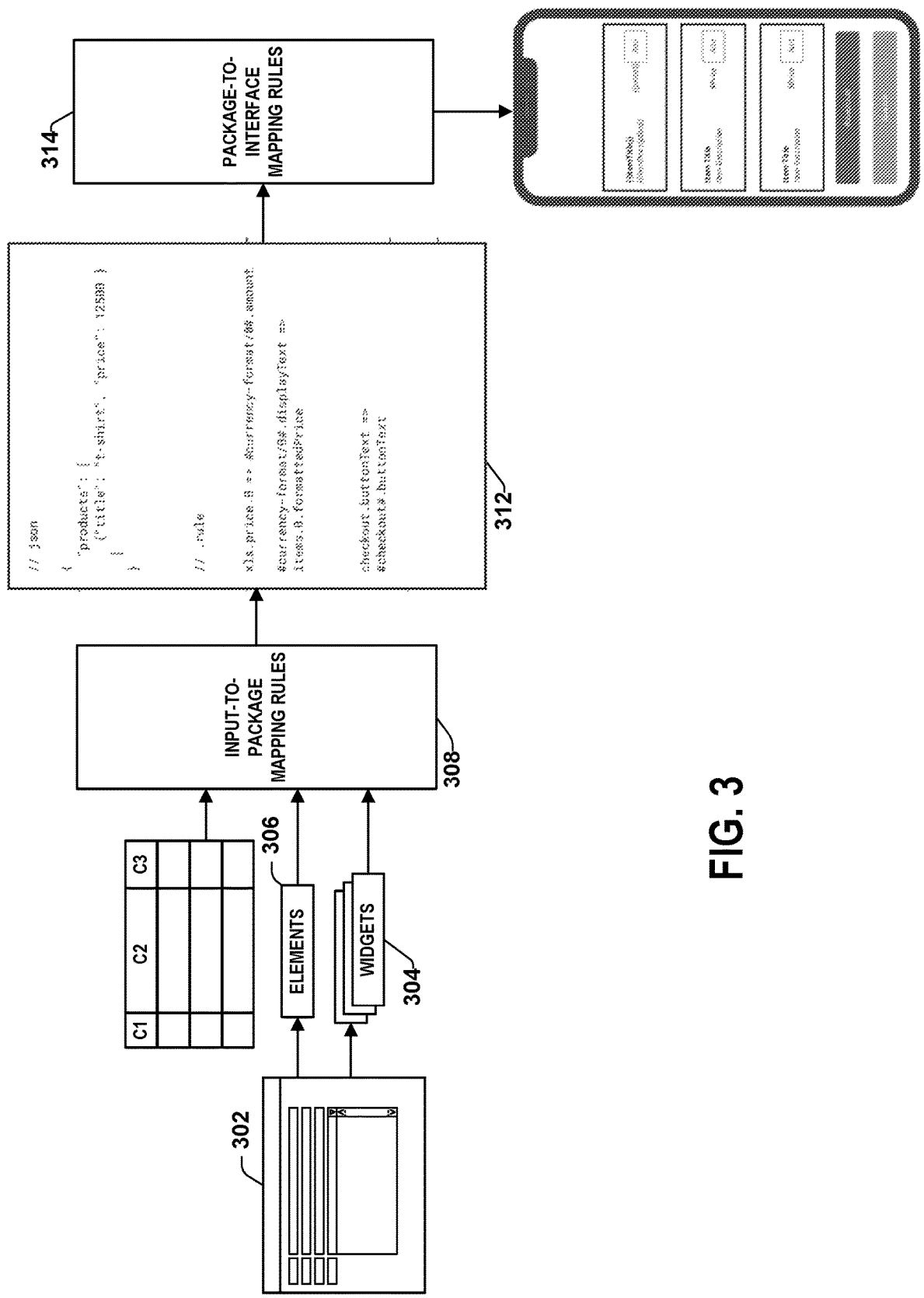
FIG. 3 is a conceptual diagram of the packager of FIG. 1 generating an offer package, according to the teachings of this disclosure.

FIG. 3 is a conceptual diagram of the packager 124 of FIG. 1 generating an offer package 120. In the illustrated example, a packager interface 302 facilitates editing of the contents of the offer package 120. The packager interface 302 includes selectors to facilitate selection of which bricks 128 (e.g., and which subbricks, etc.) to use to generate the offer package 120 and edit the parameters and metadata associated with each of the selected bricks 128. These selectors may be graphical elements that are dragged and moved in the packager interface 302 to select the bricks 128 and to define relationships between the bricks 128. For example, the bricks 128 may specify different widgets 304, different quantity pickers, different themes, different templates, define audio and/or visual assets to be used, and/or different ways to slice inventory, etc. (collectively referred to as "elements 306"). The widgets 304 define interactive interface elements in the cart interface that causes the hosting browser to perform an action that reaches externally from the browser. For example, one widget 304 may define the parameters (e.g., size, shape, position, label, etc.) of the action button. As another example, one widget 304 may define which third party payment processor to send information to facilitate instantiation of the payment processor's payment interface in the checkout interface.

In the illustrated example of FIG. 3, the packager 124 includes input-to-package mapping rules 306 that transform the widgets 304, the elements 306, and, in the illustrated example, the inventory 310 expressed in a two-dimensional table into the data interchange formatted file 312 for the offer package 120. The mapping rules 306 map the inventory 310 and information defined by and through the bricks 128 (e.g., the widgets 304 and the elements 306, etc.) into the syntax of the data interchange format such that all of the data required to build the cart interface and the checkout interface, all of the data to perform cart management functions (e.g., displaying inventory being offered, prices, and descriptions; manipulating quantities in the cart; estimating total price, etc.) are included in the offer package 120.

In the illustrated example, the data interchange formatted file 312 is a process with package-to-interface rules 314 that specify how the elements will be graphically laid out by the cart interface and/or checkout interface based on, for example, the selected theme and template bricks and the target browser in which the interfaces will be created. For example, the data interchange formatted file 312 may be processed by different sets for package-to-interface rules 314 to generate different versions of the offer package 120, where the offer initiator 120 causes the browser to download one of the versions of the offer package 120 based on the qualities of the browser. For example, a set of package-to-interface rules 314 may generate one offer package 120 for browsers operating on mobile devices (e.g., smart phones, smart watches, etc.), one offer package 120 for browsers operating on computing devices (e.g., desktop computers, tablets, laptop computers, etc.), and one offer package for browsers operating on mixed reality devices (e.g., virtual reality headsets, augmented reality headsets, etc.). Because the input-to-package rules 308 are processed separately from the package-to-interface mapping rules 314, the rules sets 308 and 314 can be updated asynchronously. That is, the template bricks may be updated and the update will be implemented the next time the offer package 120 is published.

Figure 4:
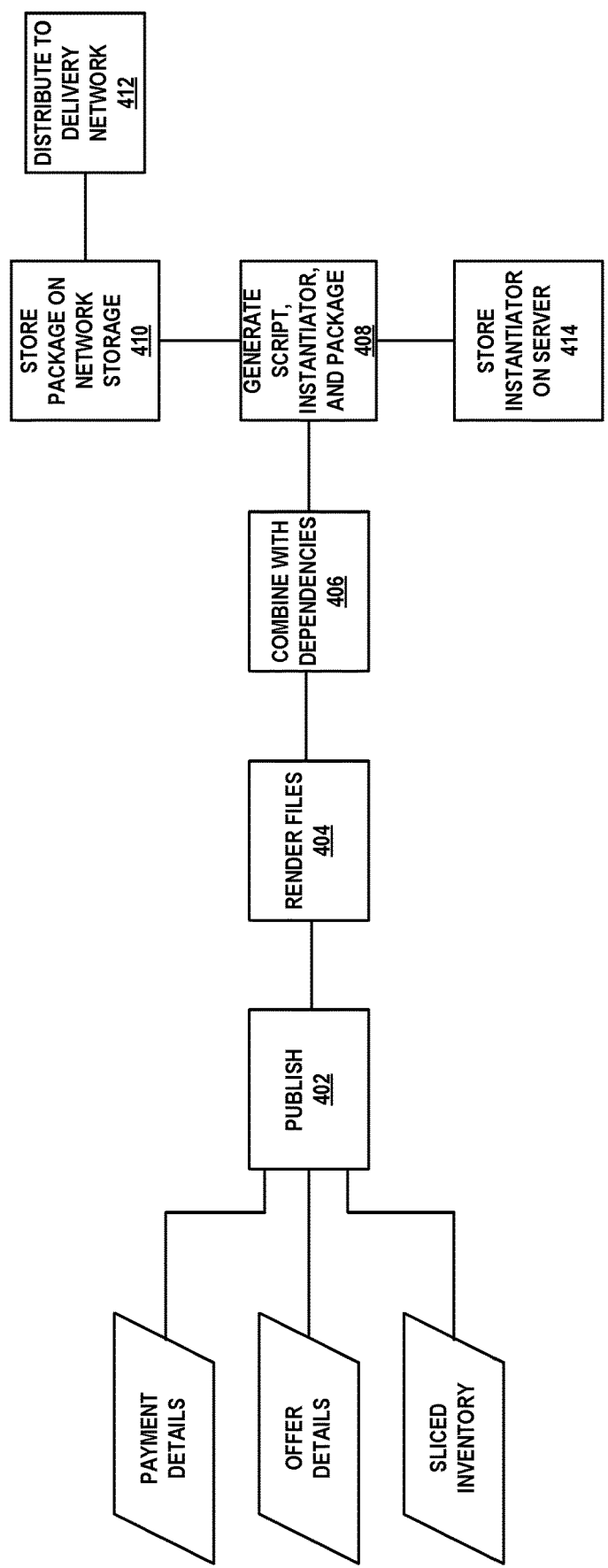
FIG. 4 is a conceptual diagram of the commerce platform of FIG. 1 publishing the offer package, according to the teachings of this disclosure.

FIG. 4 is a conceptual diagram of the commerce platform 102 of FIG. 1 publishing the offer package 120 and the offer instantiator 118. At block 402, the entity using the commerce platform 102 (e.g., the merchant 104, etc.) indicates that the offer instantiator 118 and/or the offer package 120 should be published. For example, a "publish" button may be provided in the packager interface 302. At block 404, the packager 124 renders the offer package 120. In some examples, the packager 124 renders the offer package 120 in accordance to the process described in connection with FIG. 3 above. The packager 124 may perform this rendering multiple times to generate offer packages 120 to be used by different browsers. At block 406, the packager 124 retrieves dependencies that are specified by the bricks 128 used to create the offer package 120. The dependencies may be, for example, libraries, audio and/or visual files (e.g., as designated by the selected template brick, the selected theme brick, and/or the selected quantity picker brick, etc.), and/or link paths (e.g., URLs, etc.), etc. Because bricks 128 can be updated asynchronously, dependencies that may have changed since the last time the offer package 120 was published automatically have those dependencies updated in an offer package when it is republished. At block 408, the packager 124 generates the offer package(s) 120, the script 121 used by the browser to generate the cart and checkout interfaces, and the offer instantiator 118 to be distributed. In some examples, the packager 124 may perform versioning of the offer package (s) 120 and the script 121 each time the offer package(s) is/are republished. The offer instantiator 118 may be changed to point the browser to the updated script and/or updated offer package(s) 120 when the browser refreshes. At block 410, the packager 124 stores the script, the offer package(s) 120, and/or any assets necessary to render the cart interfaces to the network storage 110. At block 412, the package 124 causes the script 121, the offer package(s) 120, and/or the assets to be distributed to the networked storage 112 in the CDN 114. In some examples, the packager 124 sends a signal to the CDN 114 invalidating the current cache, which causes the network storage 112 in the CDN 114 to update to the latest files. At block 414, the offer instantiator 118 is moved to the server(s) 108 to be accessed by the computing devices 116.

Figure 5:
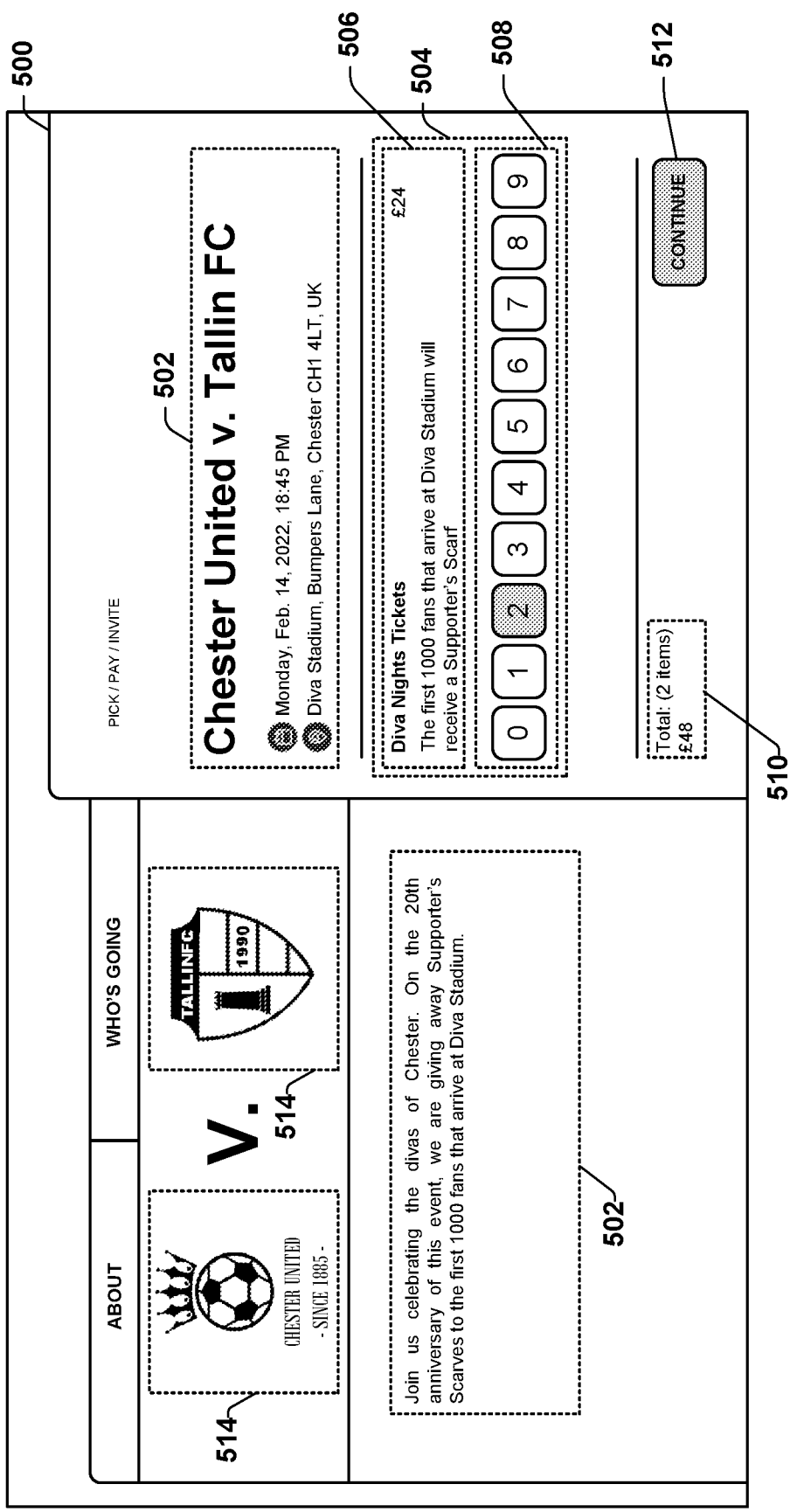
FIG. 5 illustrates an example cart interface, according the teachings of this disclosure.

FIG. 5 illustrates an example cart interface 500, generated by a browser in response to being directed to the offer instantiator 118 based on the script 121 and the offer package 120. Once the script 121 and offer package 120 are loaded in the browser, the script 121 generates the code and makes the necessary calls to instantiate the cart interface 500 and perform cart management functions without making a back-end call. In the illustrated example, the cart interface 500 includes high level description 502 of the inventory and an inventory item 504 for each piece of inventory being offered. While for illustrative purposes, only one inventory item 504 is shown, cart interface 500 may include as many inventory items 504 as are defined in the offer package 120. In some examples, the offer package 120 may define inventory items 504 in a nested or hierarchical manner. For example, inventory items 504 for goods may be initially displayed as a list of types of goods that, when clicked, reveal the inventory items 504 that fit within that type of good. As another example, for event tickets, the cart interface 500 may initially display sections, where each row within a section is an inventory item 504. The inventory item 504 include a description 506 of the inventory being offered as a quantity picker 508. The quantity picker 508 is a graphical interface that facilitates selecting a quantity of the inventory item 504. The quantity picker 508 may take different form depending on which of the quantity picker bricks was chosen while the offer package 120 was created. When the quantity of items in the quantity picker 508 is changed, the browser, without making a backend call, estimates the total amount based on the information in the offer package 120 and displays the estimated total in the total field 510. Because this calculation is done entirely within the browser: (a) the calculation is quick, and (b) the manipulation of the inventory in the cart interface 500 does not result in traffic being directed to the commerce platform 102 and does not result in any queries into the IMS of the merchant 104. Using the script 121, based on the offer package 120, this cart management is repeated until the customer interacts with the action button 512. In this manner, the customer may browse the inventory items 504 and adding items to the cart without any traffic being directed at the commerce platform 102.

The look and feel of the cart interface 500 is dictated by the selected template brick and the selected theme brick. The template brick dictates how the script 121, in conjunction with the offer package 120, generates code to define the layout of elements 502, 504, 506, 508 510, 512, and 514 within the cart interface 500. If, during block 402 of FIG. 4, the merchant were to select a different template brick or the template brick definition changed (e.g., changes that would take effect in block 406 of FIG. 4), when the customer refreshes the browser, the script 121, in conjunction with the offer package 120, would generate a changed layout. The selected theme brick dictates the aesthetic look and feel (e.g., color, audio visual assets 512, etc.). If, during block 402 of FIG. 4, the merchant were to select a different theme brick or the theme brick definition changed (e.g., changes that would take effect in block 406 of FIG. 4), when the customer refreshes the browser, the script 121, in conjunction with the offer package 120, would generate a different look and feel of the cart interface 500.

The cart interface 500 is different from the checkout interface. The cart interface 500 does not, until the action button 512 is interacted with, provide a method for the browser, during the course of the user browsing the inventory, to perform backend calls. Thus, in the cart interface 500, selecting and deselecting inventory (e.g., via the quantity picker 508) does not result in network traffic directed towards the commerce platform 102. Additionally, in some examples, actually purchasing the selected inventory cannot be accomplished through the cart interface 500 (e.g., purchasing is gated by proceeding to the checkout interface, etc.) As a result, a large number of user can simultaneously interact with a cart interface 500 instantiated entirely in their own browser without causing any network traffic to be directed towards the commerce platform 102. The checkout interface facilitates the browser receiving a calculation of actual cost of the selected inventory (via low processing-load backend calls to the commerce platform 102) and initiating purchase of the inventory (via interaction with a checkout button). Until an actual purchase of inventory is initiated (e.g., the user interacting with the checkout button), the checkout interface does not cause any queries into the IMS database 132.

Figure 6A:
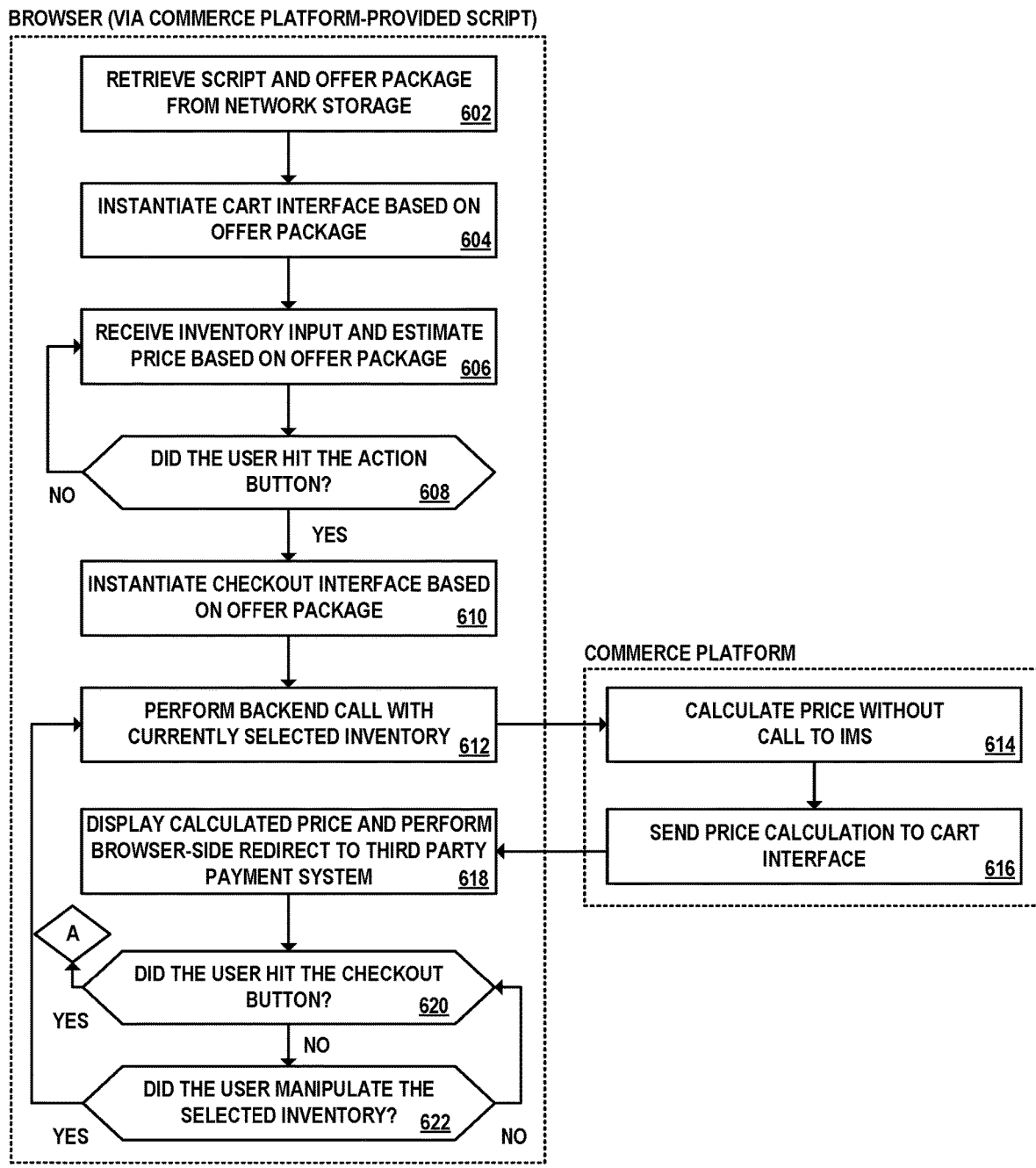
FIGS. 6A and 6B illustrate an example method to provide for a network traffic surge resistant platform, according to the teachings of this disclosure.
Figure 6B:
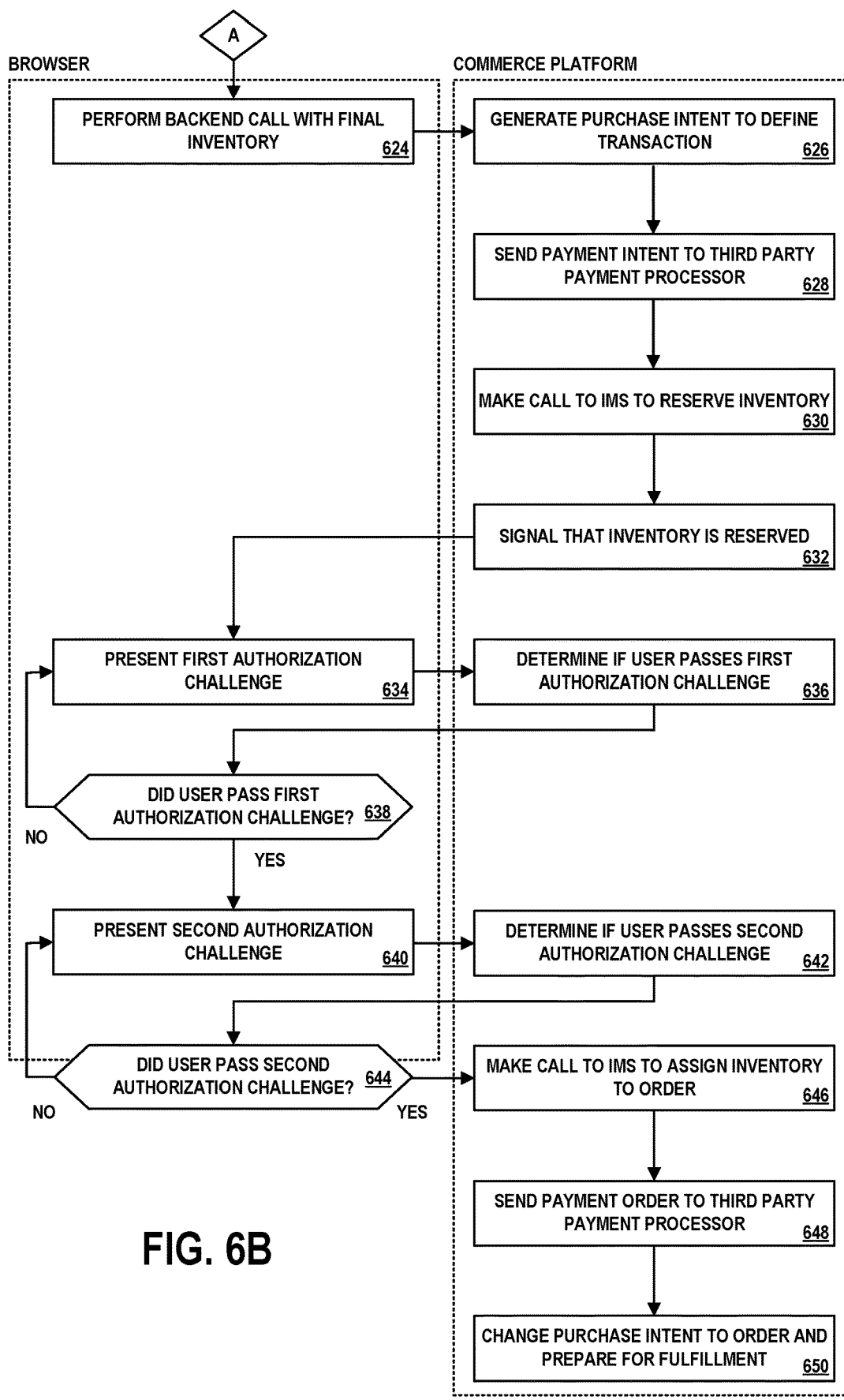

FIGS. 6A and 6B illustrate an example method to provide for a network traffic surge resistant platform. The method begins when a user loads the offer instantiator 118 into a browser. For example, the user may click on a URL that directs the browser to the offer instantiator 118. Generally, the method minimizes traffic generated towards the commerce platform 102 and queries to the IMS database 132 until the user has demonstrated that greater network traffic and database resource allocation is appropriate. Interface generation (e.g., cart interface 500 of FIG. 5, etc.) and initial cart management are performed by the browser using the processing and memory power of the computing device 116.

Initially, the browser, based on the instructions provided by the offer instantiator 118, retrieves the script 121 and offer package 120 from the network storage 112 in the CDN 114 (block 602). The distributive nature of the network storage 112 in the CDN 114, coupled to the relatively low processing and network intense activity of retrieving the script 121 and offer package 120, means that a network traffic surge is not directed at the commerce platform 102, even when a large number of users load the offer instantiator 118 into their browser. The browser, executing the script 121, instantiates the cart interface in the browser based on the offer package 120 without making any backend calls to the commerce platform 102 (block 604). The browser receives inventory input (e.g., by manipulation of the quantity picker 508, etc.) and estimates the price of the selected inventory based on the offer package 120 without making any backend calls that result in queries to the IMS (block 606). The estimated price may be displayed in the total field 510 of the cart interface 500. The browser waits until it receives an inventory input or the user interacts with the action button 512 (block 608). When the browser receives an inventory input ("NO" at block 608), the browser estimates the price of the selected inventory based on the offer package 120 without making any backend calls that result in queries to the IMS (block 606).

When the browser detects that the user interacts with the action button 512 ("YES" at block 608), the browser, using the script 121, instantiates the checkout interface based on the offer package 120 (block 610). The user may return to the cart interface (e.g., return to block 604) at any point. The browser, based on the script 121, performs a backend call to the commerce platform 102 that includes the currently selected inventory of the cart interface (block 612).

The commerce platform 102, in response to receiving the backend call, calculates a price for the currently selected inventory based on the offer package 120 without generating a query to the IMS of the merchant 104 (block 614). The offer package 120 may include obscured and/or encrypted data that commerce platform 102 is able to unobscure and/or decrypt related to costs beyond the price of the inventory. For example, the commerce platform 102 may calculate the price of the inventory, any fees specified/allowed by the contract with the merchant 104, and/or taxes to be levied on the purchase. This is a relatively low processing cost calculation. The commerce platform 102 returns the calculated price to the browser that issued the backend call (block 616).

The browser, using the script 121, displays the calculated price in the checkout interface and performs a browser-side redirect (sometimes referred to as a "client-side redirect") to the third party payment processor(s) 106 to provide the calculated price (block 618). This allows one or more payment interfaces of the third party payment processor(s) 106 to instantiate within the checkout interface and facilitate payment for the selected inventory. This browser-side redirect means that the resources of the browser, not the commerce platform 102, are used to provide the information necessary for the payment interface(s) to instantiate. Thus, if the user does not proceed with checking out, the network resources used by the user towards the commerce platform 102 have been minimal and no IMS database 132 resources have been expended because of the user.

The browser, using the script 121, determines whether the user interacts with the checkout button (block 620). When the user does not interact with the checkout button ("NO"at block 620), the browser, using the script 121, determines whether the user manipulated the selected inventory in the checkout interface (block 622). When the user manipulates the selected inventory ("YES" at block 622), the browser, based on the script 121, performs a backend call to the commerce platform 102 that includes the currently selected inventory of the cart interface (block 612). When the user does not manipulate the selected inventory ("NO"at block 622), the browser determines whether the user interacts with the checkout button (block 620). When the user interacts with the checkout button ("YES" at block 620), the browser, using the script 121, performs a backend call that includes the selected inventory (block 624 of FIG. 6B).

The commerce platform 102 generates a purchase intent to define the transactions (block 626). The purchase intent is a record of an offer identifier, a browser identifier, an order identifier, a price, and inventory to be purchased, etc. that facilitates tracking an order beginning from the offer instantiator 118 and the offer package 120 to the checkout process such that any transaction can be audited. The purchase intent is linked to the information necessary to verify the content of the transaction. The commerce platform 102 sends a payment intent to the third party payment processor 106 (block 628). The payment intent may cause the third party payment processor 106 to collect payment information from the user (e.g., via the payment processor widget, etc.) and/or place a hold on funds sufficient to pay the calculated cost. The commerce platform 102 then makes a call to the IMS of the merchant 104 to place a reserve on the selected inventory (block 630). The reserve temporary prevents the entries in the inventory database 132 representative of the inventory from being reserved or otherwise purchased. The commerce platform 102 then signals to the browser that the inventory is reserved (block 632).

The browser, using the script 121, presents a first authorization challenge (block 634), In some examples, the authorization challenges may be credentials that the user enters where at least one piece of information for the user to enter is a secret (e.g., a user specified password or passcode, an mobile application-based one-time passcode (e.g., a HMAC-based One-time Password algorithm (HOTP) code, a Time-based One-time Password Algorithm (TOTP) code, etc.), a SMS or email-based one-time password (OTP) code, a code provided by a USB or embedded chip based key (sometimes referred to as a "smartcard" or a "security token", etc.). Upon entry of the answer to the first authorization challenge, via the script 121, the browser forwards the entry to the commerce platform 102 to determine if the user passes the first authorization challenge.

The commerce platform 102 determines whether the entry provided by the user passes the first authorization challenge and forwards this determination to the browser (block 636).

The browser, using the script 121, determines whether the user passed the first authorization challenge (block 638). The authorization challenge determines whether the user is authorized to initiate the transaction by requesting secret information from the user, such as (i) credentials (e.g., a username and password) or (ii) an identifier (e.g., an email address, a mobile phone number, a messenger handle, etc.) and a one-time password (OTP) (e.g., an automatically generated numeric or alphanumeric string of characters that authenticates a user for a single transaction or login session). In some example, the OTP may be used as a form of secondary authentication. Alternatively, in some examples, the OPT may be the primary form of authentication. For example, the authorization challenge may present a login interface or an interface to input a one-time password sent to the user via the identifier. When the user does not pass the first authorization challenge ("NO" at block 638), the browser again presents a first authorization challenge (block 634). For example, the user may fail the first authorization challenge by entering a mismatched set of credentials, by entering the wrong OTP, and/or waiting too long to enter the OTP. In some examples, the browser, using the script 121, may limit the number of times the first authorization challenge may be attempted before, for example, transmitting a message to the commerce platform 102 to end the transaction (e.g., revoking the payment invent and unreserving the inventory, etc.). When the user does passes the first authorization challenge ("YES" at block 638), the browser, using the script 121, presents a second authorization challenge (block 640). For example, the user may pass the first authorization challenge by entering a matching set of credentials and/or by entering the correct OTP associated with the identifier. The second authorization challenge require entry of different secret information than the first authorization challenge that has a different origin than the secret information of the first authorization challenge. For example, the first authorization challenge may be entry of an OTP received from a SMS message and the second authorization challenge may be entry of a different OTP receive from an email. In some examples, the authorization challenges may be structured such that they may be performed without the user having an account or prior relationship with the commerce platform 102. In some examples, the first authorization challenge may require entry on a mobile phone number to which the commerce platform 102 sends a first OTP and the second authorization challenge may require entry of an email address to which the commerce platform 102 sends a second OTP. In such examples, these credentials (e.g., the mobile number and email address) may be associated with the purchase intent such that future fulfillment requires entry of the same mobile number-email address pair (e.g., in response to subsequent authorization challenges at the time of fulfillment, etc.). Although two authorization challenges are described wherein, there may be fewer (e.g., one) or more (e.g., three or more) authorization challenges. Upon entry of the answer to the second authorization challenge, via the script 121, the browser forwards the entry to the commerce platform 102 to determine if the user passes the second authorization challenge.

The commerce platform 102 determines whether the entry provided by the user passes the second authorization challenge and forwards this determination to the browser (block 642).

The browser, using the script 121, determines whether the user passed the second authorization challenge (block 644). When the user does not pass the second authorization challenge ("NO" at block 644), the browser again presents a second authorization challenge (block 640). In some examples, the browser, using the script 121, may limit the number of times the second authorization challenge may be attempted before, for example, transmitting a message to the commerce platform 102 to end the transaction (e.g., revoking the payment invent and unreserving the inventory, etc.).

When the user passes the second authorization challenge ("YES" at block 644), the commerce platform 102 makes a call to the IMS of the merchant 104 to the selected inventory to be fulfilled (block 646). The commerce platform 102 sends a payment order to the third party payment processor (block 648). The payment order causes the third party payment processor based on the payment intent. The commerce platform changes the purchase intent to a purchase order and prepares for fulfillment (e.g., perform post fulfillment tasks, such as gathering shipping information, etc.) (block 650).

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The terms "includes," "including," and "include" are inclusive and have the same scope as "comprises,""comprising," and "comprise" respectively. The claims as follows are intended to include all modifications and alterations insofar as they come within the scope of the claims or the equivalent thereof

Having thus described the invention, the following is claimed:

1. A network traffic surge resistant system comprising:
   network storage; and
   one or more servers configured as a commerce platform configured to:

generate a script, an offer package, and an offer instantiator;

store the script and the offer package onto the network storage, the offer instantiator providing the location of the script and the offer package in the network storage;

wherein, in response to a browser operating on a computing device accessing the offer instantiator:

causing, by the offer instantiator, the browser to retrieve the script and the offer package from the network storage;

causing, by the script, the browser to instantiate a cart interface within the browser based on the offer package using the resources of the computing device without making a backend call to the commerce platform, the cart interface including an action button;

causing, by the script, the browser to perform cart management functions without making a backend call to the commerce platform until detecting an interaction with the action button; and in response to the interaction with the action button, causing, by the script, the browser to:

send the backend call to the commerce platform, and instantiate, in the browser, a checkout interface based on the offer package and a response to the backend call using the resources of the computing device.

2. The system of claim 1, wherein the backend call includes an identity and quantity of a good or service currently present in the cart interface to be purchased, and wherein in response to receiving the backend call, the commerce platform is to calculate and return a total price for the good or service without making a call to an inventory management system associated with the good or service.

3. The system of claim 1, wherein the checkout interface includes one or more checkout buttons and wherein, in response to detecting an interaction with one of the checkout buttons, causing the browser, by the script, to send a second backend call to the commerce platform including an identity and quantity of a good or service currently present in the checkout interface to be purchased.

4. The system of claim 3, wherein the checkout interface includes a selection interface to facilitate a user changing the quantity of a good or service currently present in the checkout interface, and wherein in response to detecting a change in the quantity of a good or service currently present in the checkout interface, the script causes the browser to resend the second backend call to the commerce platform.

5. The system of claim 3, wherein, in response to receiving the second backend call, the commerce platform is configured to:

send a payment intent to a third party payment processor; and make a call to an inventory management system to reserve the good or service identified in the second backend call.

6. The system of claim 5, wherein the script causes the browser to present multiple, different authorization challenges.

7. The system of claim 6, wherein, in response to all of the multiple, different authorization challenges being passed, the commerce platform is configured to:

send a payment order to a third party payment processor; and make a second call to the inventory management system to mark the good or service identified in the second backend call for fulfillment.

8. The system of claim 1, wherein the offer package includes a list of all goods or services to be made available via the cart interface such that browsing the goods and services in the cart interface does not cause the browser to make a backend call to the commerce platform.

9. The system of claim 1, wherein to cause the browser to instantiate the cart interface, the script generates instructions, using the resources of the computing device, for the browser to execute based on the offer package.

10. There system of claim 1, wherein to change goods or services to be purchasable through the cart interface, the commerce platform is to regenerate the offer package and restore the offer package to the network storage without sending any communication to the browser.

11. A method to provide a surge resistant online platform comprising:

generating, by the online platform, a script, an offer package, and an offer instantiator, and storing the script and the offer package onto the network storage, the offer instantiator providing the location of the script and the offer package in the network storage;

retrieving, by a browser operating on a computing device at the direction of the offer instantiator, the script and the offer package from the network storage;

instantiating, by the script executing in the browser, a cart interface within the browser based on the offer package using the resources of the computing device without making a backend call to the commerce platform, the cart interface including an action button;

performing, by the script executing in the browser, cart management functions without making a backend call to the commerce platform until detecting an interaction with the action button; and in response to the interaction with the action button, by the script executing in the browser, (i) sending the backend call to the commerce platform, the backend call including an identity and quantity of a good or service currently present in the cart interface to be purchased, and (ii) instantiating, in the browser, a checkout interface based on the offer package and a response to the backend call using the resources of the computing device, the checkout interface including one or more checkout buttons and a selection interface to facilitate a user changing the quantity of a good or service currently present in the checkout interface.

12. The method of claim 11, further comprising, in response to receiving the backend call, calculating and returning, by the commerce platform, a total price for the good or service without making a call to an inventory management system associated with the good or service.

13. The method of claim 11, further comprising, in response to detecting an interaction with one of the checkout buttons, sending, by the script executing in the browser, a second backend call to the commerce platform including an identity and quantity of a good or service currently present in the checkout interface to be purchased.

14. The method of claim 13, further comprising, in response to detecting a change in the quantity of a good or service currently present in the checkout interface, resending, by the script executing in the browser, the second backend call to the commerce platform.

15. The method of claim 13, wherein, in response to receiving the second backend call sending, by the script executing in the browser, a payment intent to a third party payment processor; and making a call to an inventory management system to reserve the good or service identified in the second backend call.

16. The method of claim 15, further comprising presenting, by the script executing in the browser, multiple, different authorization challenges before proceeding with any transaction.

17. The method of claim 16, further comprising, in response to all of the multiple, different authorization challenges being passed, by the script executing in the browser:
sending a payment order to a third party payment processor; and
making a second call to the inventory management system to mark the good or service identified in the second backend call for fulfillment.

18. The method of claim 11, wherein the offer package includes a list of all goods or services to be made available via the cart interface such that browsing the goods and services in the cart interface does not cause the browser to make a backend call to the commerce platform.

19. The method of claim 11, wherein to cause the browser to instantiate the cart interface, the script generates instructions, using the resources of the computing device, for the browser to execute based on the offer package.

20. A system to provide a network traffic surge resistant platform comprising:
network storage devices; and
one or more servers configured as the network traffic surge resistant platform, the network traffic surge resistant platform configured to (i) generate a script, an offer package, and an offer instantiator, (ii) store the script and the offer package onto the network storage, the offer instantiator providing the location of the script and the offer package in the network storage, and (iii) provide the offer instantiator to multiple browsers, each operating on a different computing device, the offer instantiator causing each of the browsers to retrieve the script and the offer package from one of the network storage devices;
wherein the script causes each of the browsers to:
instantiate a cart interface within the browser based on the offer package using the resources of the corresponding computing device without making a backend call to the network traffic surge resistant platform such that the multiple browsers simultaneously instantiating the cart interface does not cause network traffic directed at the network traffic surge resistant platform, the cart interface including an action button;
perform cart management functions without making a backend call to the commerce platform until detecting an interaction with the action button, such that the multiple browsers simultaneously performing the cart management functions in the cart interface does not cause network traffic directed at the network traffic surge resistant platform; and
in response to the interaction with the action button, (i) send the backend call to the commerce platform, and (ii) instantiate, in the browser using the resources of the corresponding computing device, a checkout interface based on the offer package and a response to the backend call.

* * * * *